United States Patent
Komamiya et al.

(10) Patent No.: US 9,296,230 B2
(45) Date of Patent: Mar. 29, 2016

(54) DATA PROCESSING APPARATUS, DATA PROCESSING METHOD AND INKJET PRINTING APPARATUS

(75) Inventors: Eiji Komamiya, Kawasaki (JP);
Yoshinori Nakajima, Yokohama (JP);
Mitsutoshi Nagamura, Tokyo (JP);
Shingo Nishioka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 153 days.

(21) Appl. No.: 13/446,138

(22) Filed: Apr. 13, 2012

(65) Prior Publication Data

US 2012/0268752 A1    Oct. 25, 2012

(30) Foreign Application Priority Data

Apr. 19, 2011    (JP) .................................. 2011-093064

(51) Int. Cl.
*B41J 2/205* (2006.01)
*B41J 19/14* (2006.01)
*G06K 15/10* (2006.01)

(52) U.S. Cl.
CPC ............. *B41J 19/147* (2013.01); *G06K 15/107* (2013.01)

(58) Field of Classification Search
CPC .................. B41J 2/01; B41J 2/21; B41J 2/04; B41J 2/2054; B41J 2/2056; B41J 2/2132; B41J 19/147; G06K 15/02; G06K 15/102; G06K 15/107
USPC .................................................. 347/15, 9–14
See application file for complete search history.

(56) References Cited

U.S. PATENT DOCUMENTS

| | | | |
|---|---|---|---|
| 6,523,939 B1* | 2/2003 | Ellson et al. ..................... | 347/46 |
| 2005/0017999 A1* | 1/2005 | Yoshida ............................ | 347/6 |
| 2006/0146090 A1* | 7/2006 | Fellingham et al. ............ | 347/41 |
| 2008/0309952 A9* | 12/2008 | Billow et al. ................... | 358/1.8 |
| 2010/0033526 A1* | 2/2010 | Toda et al. ....................... | 347/12 |
| 2010/0214342 A1* | 8/2010 | Kuno ............................... | 347/15 |
| 2010/0277533 A1* | 11/2010 | Erdtmann et al. .............. | 347/14 |

FOREIGN PATENT DOCUMENTS

JP    2001-180017 A    7/2001

* cited by examiner

*Primary Examiner* — Geoffrey Mruk
*Assistant Examiner* — Scott A Richmond
(74) *Attorney, Agent, or Firm* — Fitzpatrick, Cella, Harper & Scinto

(57) ABSTRACT

A data processing apparatus, a data processing method and an inkjet printing apparatus are offered that are capable of reducing, in any kind of image, the occurrence of color unevenness while achieving a high speed output via a bi-directional printing. In order to achieve this, forward scan print ratio and backward scan print ratio with respect to a predetermined area comprising a plurality of pixels is set based on multi-value image data of the predetermined area. Next, binary print data for the forward scans and binary print data for the backward scans at the predetermined area is generated based on the multi-value image data and the set print ratios. According to such a configuration it is possible to increase the ratio of bi-directional printing with respect to areas at which color unevenness appears with difficulty, and increase the ratio of one-directional printing at areas where color unevenness appears with ease.

12 Claims, 20 Drawing Sheets

1ST PRINT SCAN

2ND PRINT SCAN

|  | RATIO SWITCHING THRESHOLD | INDEX SWITCHING QUANTITY |
|---|---|---|
|  | th0 BELOW | 0 |
| th0 | 32 | 1 |
| th1 | 64 | 2 |
| th2 | 96 | 3 |
| th3 | 128 | 4 |
| th4 | 160 | 5 |
| th5 | 192 | 6 |
| th6 | 224 | 7 |
| th7 | 256 | 8 |
| th8 | 288 | 9 |
| th9 | 320 | 10 |
| th10 | 352 | 11 |
| th11 | 384 | 12 |
| th12 | 416 | 13 |
| th13 | 448 | 14 |
| th14 | 480 | 15 |
| th15 | 512 | 16 |
| th16 | 544 | 17 |
| th17 | 576 | 18 |
| th18 | 608 | 19 |
| th19 | 640 | 20 |
| th20 | 672 | 21 |
| th21 | 704 | 22 |
| th22 | 736 | 23 |
| th23 | 768 | 24 |
| th24 | 800 | 25 |
| th25 | 832 | 26 |
| th26 | 864 | 27 |
| th27 | 896 | 28 |
| th28 | 928 | 29 |
| th29 | 960 | 30 |
| th30 | 992 | 31 |
| th31 | 1024 | 32 |

THRESHOLD TABLE FOR PERFORMING
INDEX SWITCHING QUANTITY DETERMINATION

FIG.9

8 PIXELS

| 0 | 8 | 20 | 28 | 2 | 10 | 22 | 30 |
|---|---|----|----|---|----|----|----|
| 16 | 24 | 4 | 12 | 18 | 26 | 6 | 14 |
| 3 | 11 | 23 | 31 | 1 | 9 | 21 | 29 |
| 19 | 27 | 7 | 15 | 17 | 25 | 5 | 13 |

4 PIXELS

INDEX PATTERN GROUP SELECTION
THRESHOLD VALUE MATRIX

FIG.10A

| 0 | 8 | 20 | 28 | 2 | 10 | 22 | 30 |
|---|---|----|----|---|----|----|----|
| 16 | 24 | 4 | 12 | 18 | 26 | 6 | 14 |
| 3 | 11 | 23 | 31 | 1 | 9 | 21 | 29 |
| 19 | 27 | 7 | 15 | 17 | 25 | 5 | 13 |

INDEX SWITCHING QUANTITY

FIG.10B

| I | II | III | IV | IV | III | II | I |
|---|---|---|---|---|---|---|---|
| IV | III | II | I | I | II | III | IV |
| I | II | III | IV | IV | III | II | I |
| IV | III | II | I | I | II | III | IV |

INDEX SELECTION TABLE A

FIG.12A

| V | VI | VII | VIII | VIII | VII | VI | V |
|---|---|---|---|---|---|---|---|
| VIII | VII | VI | V | V | VI | VII | VIII |
| V | VI | VII | VIII | VIII | VII | VI | V |
| VIII | VII | VI | V | V | VI | VII | VIII |

INDEX SELECTION TABLE B

FIG.12B

|                                                                    |                                                                   |                                                                    |                                                                    |
| ------------------------------------------------------------------ | ----------------------------------------------------------------- | ------------------------------------------------------------------ | ------------------------------------------------------------------ |
| AREA A<br>DETERMINATION<br>VALUE S = 530<br>SWITCHING<br>QUANTITY 16 | AREA B<br>DETERMINATION<br>VALUE S = 20<br>SWITCHING<br>QUANTITY 0 | AREA C<br>DETERMINATION<br>VALUE S = 540<br>SWITCHING<br>QUANTITY 16 | AREA D<br>DETERMINATION<br>VALUE S = 850<br>SWITCHING<br>QUANTITY 26 |
| AREA E<br>DETERMINATION<br>VALUE S = 1050<br>SWITCHING<br>QUANTITY 32 | AREA F<br>DETERMINATION<br>VALUE S = 850<br>SWITCHING<br>QUANTITY 26 | AREA G<br>DETERMINATION<br>VALUE S = 10<br>SWITCHING<br>QUANTITY 0 | AREA H<br>DETERMINATION<br>VALUE S = 530<br>SWITCHING<br>QUANTITY 16 |
| AREA I<br>DETERMINATION<br>VALUE S = 1060<br>SWITCHING<br>QUANTITY 32 | AREA J<br>DETERMINATION<br>VALUE S = 540<br>SWITCHING<br>QUANTITY 16 | AREA K<br>DETERMINATION<br>VALUE S = 1070<br>SWITCHING<br>QUANTITY 32 | AREA L<br>DETERMINATION<br>VALUE S = 860<br>SWITCHING<br>QUANTITY 26 |
| AREA M<br>DETERMINATION<br>VALUE S = 850<br>SWITCHING<br>QUANTITY 26 | AREA N<br>DETERMINATION<br>VALUE S = 20<br>SWITCHING<br>QUANTITY 0 | AREA O<br>DETERMINATION<br>VALUE S = 1040<br>SWITCHING<br>QUANTITY 32 | AREA P<br>DETERMINATION<br>VALUE S = 530<br>SWITCHING<br>QUANTITY 16 |

PRINT DIRECTION RATIO SWITCHING JUDGMENT RESULT

FIG.13A

8 PIXELS / 4 PIXELS

| | | | |
|---|---|---|---|
| PRINT RATIO 75% | PRINT RATIO 50% | PRINT RATIO 75% | PRINT RATIO 90% |
| PRINT RATIO 100% | PRINT RATIO 90% | PRINT RATIO 50% | PRINT RATIO 75% |
| PRINT RATIO 100% | PRINT RATIO 75% | PRINT RATIO 100% | PRINT RATIO 90% |
| PRINT RATIO 90% | PRINT RATIO 50% | PRINT RATIO 100% | PRINT RATIO 75% |

FORWARD SCAN

FIG.13B

| | | | |
|---|---|---|---|
| PRINT RATIO 25% | PRINT RATIO 50% | PRINT RATIO 25% | PRINT RATIO 10% |
| PRINT RATIO 0% | PRINT RATIO 10% | PRINT RATIO 50% | PRINT RATIO 25% |
| PRINT RATIO 0% | PRINT RATIO 25% | PRINT RATIO 0% | PRINT RATIO 10% |
| PRINT RATIO 10% | PRINT RATIO 50% | PRINT RATIO 0% | PRINT RATIO 25% |

BACKWARD SCAN

FIG.13C

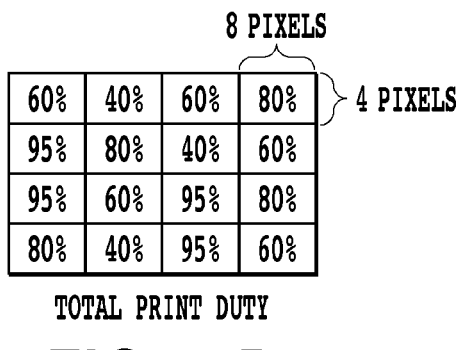

TOTAL PRINT DUTY

FIG.13D

| PRINT DUTY 45% | PRINT DUTY 20% | PRINT DUTY 45% | PRINT DUTY 72% |
|---|---|---|---|
| PRINT DUTY 95% | PRINT DUTY 72% | PRINT DUTY 20% | PRINT DUTY 45% |
| PRINT DUTY 95% | PRINT DUTY 45% | PRINT DUTY 95% | PRINT DUTY 72% |
| PRINT DUTY 72% | PRINT DUTY 20% | PRINT DUTY 95% | PRINT DUTY 45% |

FORWARD SCAN

FIG.13E

| PRINT DUTY 15% | PRINT DUTY 20% | PRINT DUTY 15% | PRINT DUTY 8% |
|---|---|---|---|
| PRINT DUTY 0% | PRINT DUTY 8% | PRINT DUTY 20% | PRINT DUTY 15% |
| PRINT DUTY 0% | PRINT DUTY 15% | PRINT DUTY 0% | PRINT DUTY 8% |
| PRINT DUTY 8% | PRINT DUTY 20% | PRINT DUTY 0% | PRINT DUTY 15% |

BACKWARD SCAN

FIG.13F

1ST PRINT SCAN

2ND PRINT SCAN

3RD PRINT SCAN

| 1 | 2 | 3 | 4 |
|---|---|---|---|
| 5 | 6 | 7 | 8 |

FIG.15

| SUBDVISION | INPUT VALUE |
|---|---|
| A | 192~255 |
| B | 128~191 |
| C | 64~127 |
| D | 0~63 |

GRADATION DIVISION CHART

FIG.17A

| HUE NO. | R | G | B | DETERMINATION VALUE TN |
|---|---|---|---|---|
| 1 | A | A | A | 6 |
| 2 | A | A | B | 8 |
| 3 | A | A | C | 12 |
| 4 | A | A | D | 24 |
| 5 | A | B | A | 8 |
| 6 | A | C | A | 12 |
| 7 | A | D | A | 24 |
| 8 | A | B | B | 10 |
| 9 | A | C | B | 14 |
| 10 | A | D | B | 26 |
| 11 | A | B | C | 14 |
| 12 | A | C | C | 18 |
| 13 | A | D | C | 30 |
| 14 | A | B | D | 26 |
| 15 | A | C | D | 30 |
| 16 | A | D | D | 42 |
| 17 | B | B | A | 10 |
| 18 | B | B | B | 12 |
| 19 | B | B | C | 16 |
| 20 | B | B | D | 28 |
| 21 | B | A | B | 10 |
| 22 | B | C | B | 16 |
| 23 | B | D | B | 28 |
| 24 | B | A | A | 8 |
| 25 | B | C | A | 14 |
| 26 | B | D | A | 26 |
| 27 | B | A | C | 14 |
| 28 | B | C | C | 20 |
| 29 | B | D | C | 32 |
| 30 | B | A | D | 26 |
| 31 | B | C | D | 32 |
| 32 | B | D | D | 44 |
| 33 | C | C | A | 18 |
| 34 | C | C | B | 20 |
| 35 | C | C | C | 24 |
| 36 | C | C | D | 36 |
| 37 | C | A | A | 12 |
| 38 | C | B | A | 14 |
| 39 | C | D | A | 30 |
| 40 | C | A | B | 14 |
| 41 | C | B | B | 16 |
| 42 | C | D | B | 32 |
| 43 | C | A | C | 18 |
| 44 | C | B | C | 20 |
| 45 | C | D | C | 36 |
| 46 | C | A | D | 30 |
| 47 | C | B | D | 32 |
| 48 | C | D | D | 48 |
| 49 | D | D | A | 42 |
| 50 | D | D | B | 44 |
| 51 | D | D | C | 48 |
| 52 | D | D | D | 60 |
| 53 | D | A | D | 42 |
| 54 | D | B | D | 44 |
| 55 | D | C | D | 48 |
| 56 | D | A | D | 42 |
| 57 | D | B | D | 44 |
| 58 | D | C | D | 48 |
| 59 | D | A | C | 30 |
| 60 | D | B | C | 32 |
| 61 | D | C | C | 36 |
| 62 | D | A | D | 42 |
| 63 | D | B | D | 44 |
| 64 | D | C | D | 48 |

HUE MATRIX CHART

FIG.17B

| | RATIO SWITCHING THRESHOLD | INDEX SWITCHING QUANTITY |
|---|---|---|
| | th0 BELOW | 0 |
| th0 | 0 | 1 |
| th1 | 1 | 2 |
| th2 | 2 | 3 |
| th3 | 4 | 4 |
| th4 | 6 | 5 |
| th5 | 8 | 6 |
| th6 | 10 | 7 |
| th7 | 12 | 8 |
| th8 | 14 | 9 |
| th9 | 16 | 10 |
| th10 | 18 | 11 |
| th11 | 20 | 12 |
| th12 | 22 | 13 |
| th13 | 24 | 14 |
| th14 | 26 | 15 |
| th15 | 28 | 16 |
| th16 | 30 | 17 |
| th17 | 32 | 18 |
| th18 | 34 | 19 |
| th19 | 36 | 20 |
| th20 | 38 | 21 |
| th21 | 40 | 22 |
| th22 | 42 | 23 |
| th23 | 44 | 24 |
| th24 | 46 | 25 |
| th25 | 48 | 26 |
| th26 | 50 | 27 |
| th27 | 52 | 28 |
| th28 | 54 | 29 |
| th29 | 56 | 30 |
| th30 | 58 | 31 |
| th31 | 60 | 32 |

HUE MATRIX CHART

FIG.17C

DATA PROCESSING APPARATUS, DATA PROCESSING METHOD AND INKJET PRINTING APPARATUS

BACKGROUND OF THE INVENTION

1. Field of the Invention

The invention relates to a data processing method for an inkjet printing apparatus that prints an image by ejecting a printing liquid such as ink on a print medium while a print head scans. In particular, the invention relates to a data processing method of an inkjet printing apparatus that prints an image on a print medium by way of bi-directional print scans of a plurality of print heads that eject different inks.

2. Description of the Related Art

As for serial type color inkjet printing apparatuses there are many cases where multiple print heads, corresponding to ink colors such as yellow (Y), magenta (M), cyan (C), and black (K), for example, are mounted on a carriage such as to be aligned in the direction of movement of the carriage. An image is gradually formed on the print medium by way of alternately repeating print scans that eject ink from these print heads according to image data while the carriage moves, and conveyance operations that convey the print medium in a sub-scanning direction that crosses the direction of print scanning.

Here, if a bi-directional printing is performed that ejects ink in both the forward scanning and backward scanning of the carriage it is possible to decrease the printing time in comparison to a one-direction printing that ejects ink during the forward scans only. With such bi-directional printing, however, the order of applying ink on the print medium during the forward scans and backward scans is reversed.

For example, in the case where print heads are arranged in the carriage in the order K, C, M, and then Y in the main scanning direction, during the forward scan ink is applied on the print medium in the order K, C, M, and then Y. During the backward scan, however, ink is applied in the order Y, M, C, and then K. That is, bands in which ink is applied in the order K, C, M, and then Y and bands in which ink is applied in the order Y, M, C, and then K are disposed alternatingly on the print medium along the sub-scanning direction. It is known that generally, in the case where multiple colors of ink are applied on a print medium, although the ink combination is the same, when the order of application differs a difference in coloring appears. Hence even in the case of a uniform image a color difference between the bans printed at the forward scans and the bands printed at the backward scans occurs, and this brings forth an image deterioration known as color unevenness.

Such color unevenness can be reduced to an extent by performing a multi-pass printing, for example. In a multi-pass printing, printing is performed with respect to only a portion of the pixels, among the plurality of pixels disposed in 1 band, during a single print scan. Next, printing is performed with respect to the remaining pixels at separate, differing print scans. Thus, multiple pixels at which ink was applied in the order K, C, M, and then Y, and multiple pixels at which ink was applied in the order Y, M, C, and then K, are mixed together at all bands. As a result it is difficult for a color difference to stand out between adjacent bands.

The sizes of the individual dots that are formed on the print medium, however, are generally designed to be larger than the area of 1 pixel. Thus, as is to be expected, even in the case where multi-pass printing has been performed a color difference will occur to some extent between bands at which printing was performed in the order K, C, M, Y then Y, M, C, K and bands at which printing was performed in the order Y, M, C, K then K, C, M, Y.

In Japanese Patent Laid-Open No. 2001-180017, for example, a configuration is disclosed wherein attention is given to the existence of images where color unevenness stands out evenly and images where color unevenness is difficult to stand out, and in which bi-directional printing and one-directional printing are switched according to the image data. More concretely, the number of dots printed at a prescribed area of the print medium are counted by ink color, bi-directional printing is performed at areas at which the counted result does not exceed a threshold value that is feared for color unevenness, and one-directional printing is performed at areas where the counted result exceeds the threshold value. If such a printing method is employed, at images where color unevenness is difficult to stand out an image is printed at a comparatively high speed by a bi-directional printing, and it is possible to prevent the occurrence of color unevenness by way of a one-directional printing at images where color unevenness stands out easily.

With the method of Japanese Patent. Laid-Open No. 2001-180017, however, in the case of images where areas exceeding the prescribed threshold continue in succession, a printing operation that is the same as a conventional one-directional printing will be performed and it is not possible to obtain the high speed output effect of bi-directional printing.

SUMMARY OF THE INVENTION

The present invention was formed in order to resolve the above described problems of the prior art. Thus, it is an object of the invention to provide a data processing apparatus, a data processing method and an inkjet printing apparatus that are capable of reducing, in any kind of image, the occurrence of color unevenness while achieving a high speed output via a bi-directional printing.

In a first aspect of the present invention, there is provided a data processing apparatus for printing an image on a print medium by causing plurality of print heads, that are arranged in a main scanning direction and ejecting different inks, to eject ink based on binary print data while repeating forward scans and backward scans of said plurality of print heads in relation to said main scanning direction, comprising: a print ratio setting unit that sets the print ratio between said forward scans and the print ratio of said backward scans with respect to a predetermined area comprising plurality of pixels based on multi-value image data of said plurality of pixels; and a print data generation unit that generates binary print data for said forward scans at said predetermined area and binary print data for said backward scans at said predetermined area based on said multi-value image data and said print ratio of said forward scans and said print ratio of said backward scans set by said print ratio setting unit.

In a second aspect of the present invention, there is provided a data processing method for printing an image on a print medium by causing plurality of print heads, that are arranged in a main scanning direction and eject different inks, to eject ink based on binary print data while repeating outbound scans and inbound scans of said plurality of print heads in relation to said main scanning direction, comprising: a print ratio setting step that sets the print ratio between said forward scans and the print ratio of said backward scans with respect to a predetermined area comprising plurality of pixels based on multi-value image data of said plurality of pixels; and a print data generation step that generates binary print data for said forward scans at said predetermined area and binary print data for said backward scans at said predetermined area based on said multi-value image data and said print ratio of said forward scans and said print ratio of said backward scans set by said print ratio setting step.

In a third aspect of the present invention, there is provided a inkjet printing apparatus for printing an image on a print medium by causing plurality of print heads, that are arranged in a main scanning direction and eject different inks, to eject ink based on binary print data while repeating forward scans and backward scans of said plurality of print heads in relation to said main scanning direction, comprising: a print ratio setting unit that sets the print ratio between said forward scans and the print ratio of said backward scans with respect to a predetermined area comprising plurality of pixels based on multi-value image data of said plurality of pixels; a print data generation unit that generates binary print data for said forward scans at said predetermined area and binary print data for said backward scans at said predetermined area based on said multi-value image data and said print ratio of said forward scans and said print ratio of said backward scans set by said print ratio setting unit; and a unit that print an image on said print medium by causing said print head to eject ink while repeating said forward print scans and said backward print scans based on binary print data generated by said print data generation unit.

Further features of the present invention will become apparent from the following description of exemplary embodiments (with reference to the attached drawings).

BRIEF DESCRIPTION OF THE DRAWINGS

FIG. 9 is a drawing that illustrates the threshold table referenced at step S4 of FIG. 8;

FIGS. 10A and 10B are drawings that illustrate an index pattern selection matrix;

FIGS. 12A and 12B are drawings that illustrate an example of an index selection table;

FIGS. 13A to 13F are drawings for concretely explaining the printing state at each area;

FIG. 15 is a diagram that illustrates the arrangement state of the areas that store binary data, in a second embodiment;

FIGS. 17A to 17C are drawings that illustrate an index switching quantity acquisition method of a third embodiment.

DESCRIPTION OF THE EMBODIMENTS

Figure 1:
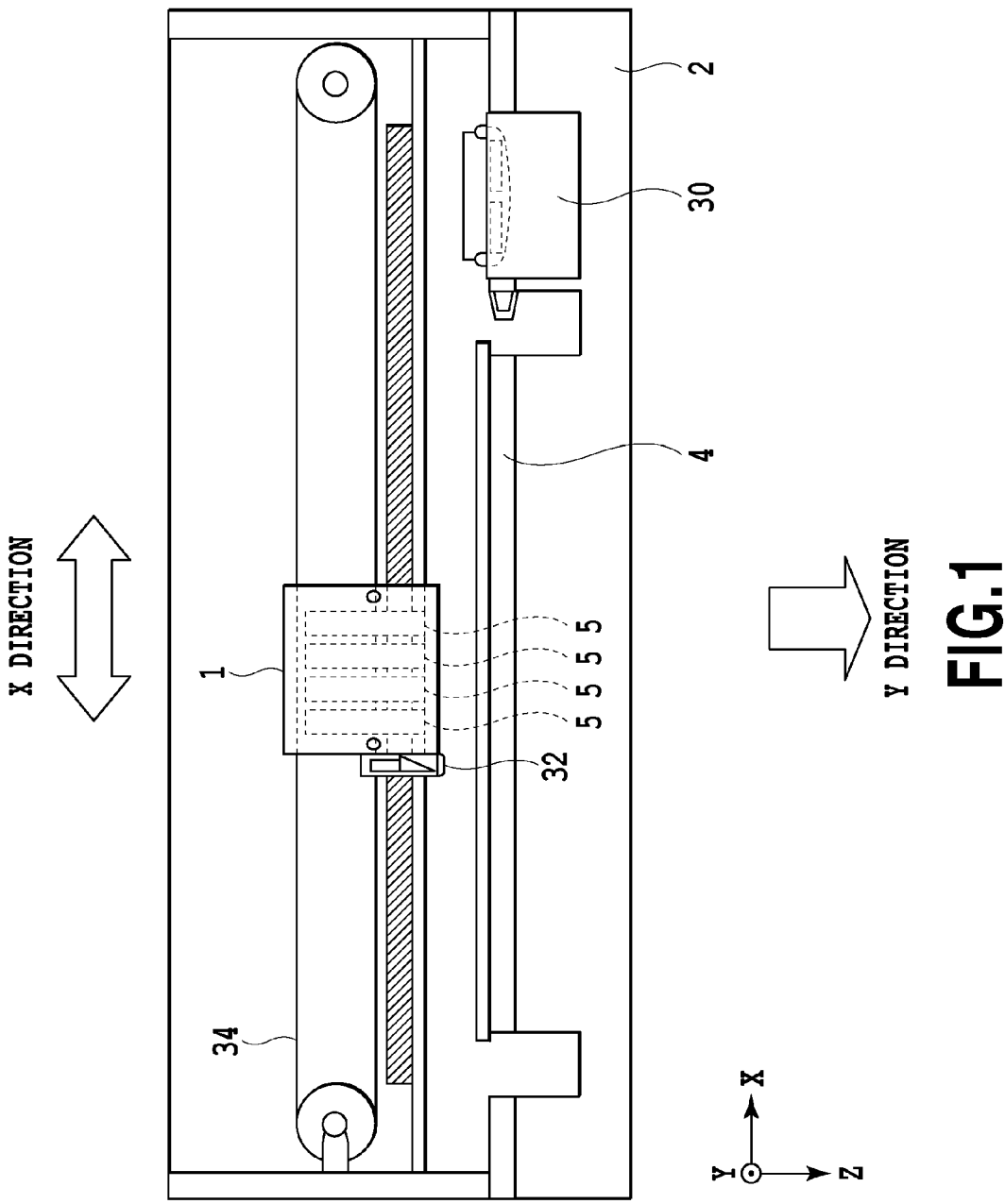
FIG. 1 is a cross sectional view of a color serial type inkjet printing apparatus.

Embodiments of the invention will be described in detail below while referring to the drawings.

FIG. 1 is a cross-section view of a serial-type color inkjet printing apparatus 2 used in several embodiments of the invention (also simply referred to hereinafter as the "inkjet printing apparatus"). The carriage 1 is capable of moving back and forth in the main scanning direction (the X direction) by way of a driving force transmitted from an unshown carriage motor through the belt 34. Print heads 5, a plurality of which have been arranged according to the types of ink, are mounted in parallel along the X direction (the main scanning direction), as shown in the figure. A plurality of nozzles is aligned on each of the individual print heads 5 at a prescribed pitch along the sub-scanning direction (the Y direction). While the carriage 1 moves in the X direction ink is ejected, according to image data, as drops from the individual nozzles, and the dots are printed on a print medium supported by the platen 4. one print scan is performed accordingly. An image is incrementally formed on the print medium by alternatingly repeating such print scans and conveyance operations that convey the print medium in the Y direction (the conveyance direction).

An optical sensor 32 is provided on the carriage 1 and is capable of detecting the presence or absence of the print medium on the platen 4 while moving with the carriage 1 in the X direction.

A suctioning recovery device 30, for maintaining the ejection capacity of the print head 5 in a suitable state, is provided on the inkjet printing apparatus 2. A device, etc. is provided on the suctioning recovery device 30, which device is for covering the ejection ports formed at the ends of the nozzles with a cap, generating negative pressure inside the cap via a pump, and forcibly ejecting hardened ink from inside the nozzles.

Figure 2:
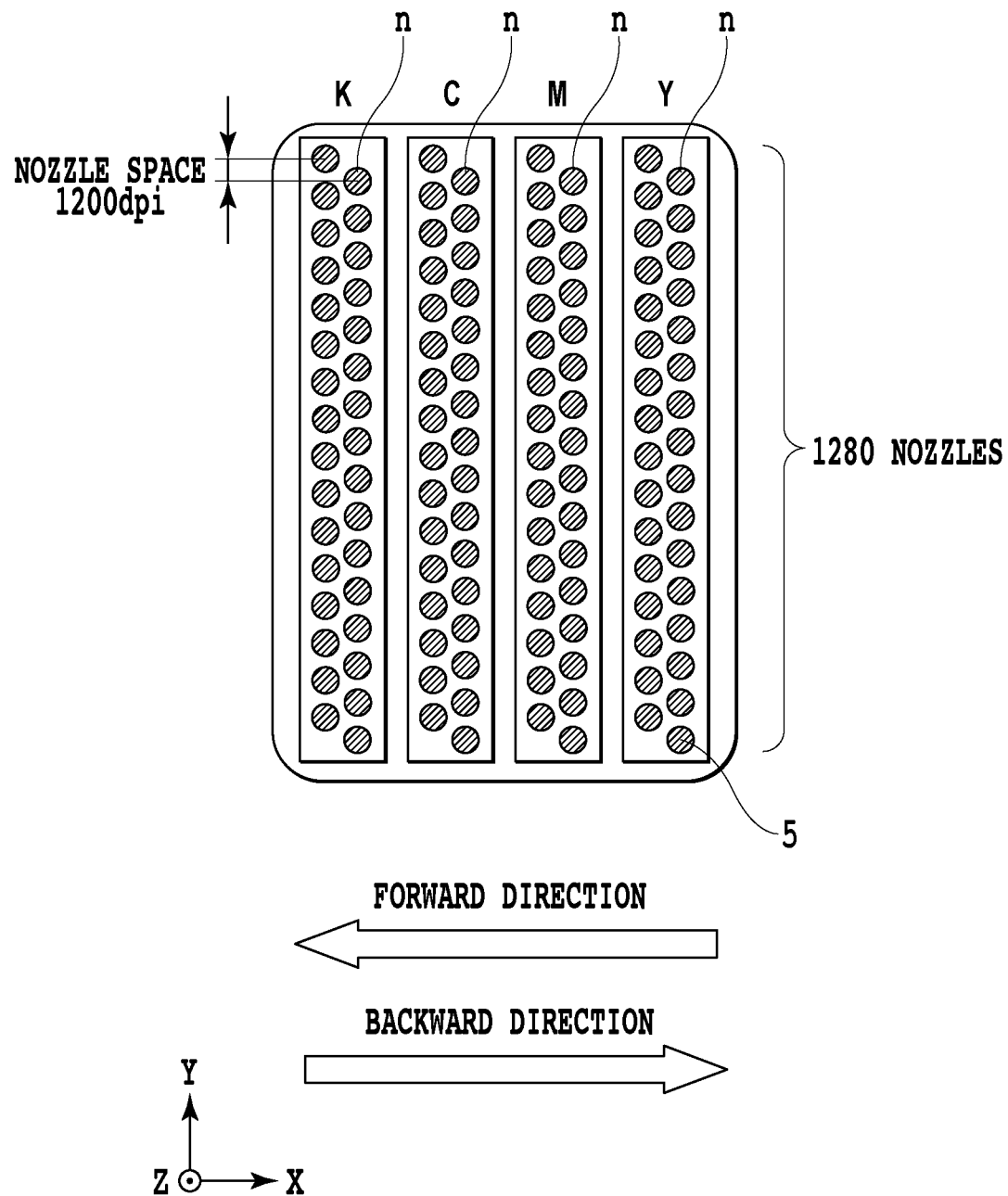
FIG. 2 is a schematic plan view for explaining the alignment of nozzles on print heads.

FIG. 2 is a schematic plain view for explaining the alignment of the nozzles on the print heads 5. In this embodiment 4 print heads, which respectively eject black (K), cyan (C), magenta (M) and yellow (Y) ink, are aligned in parallel on the carriage 1, in the order shown in the figure. By way of such an alignment ink is applied to the print medium in the order K, C, M and then Y, during the forward scan of the carriage 1. On the other hand, ink is applied to the print medium in the order Y, M, C and then K, during the backward scan of the carriage 1.

1280 nozzles n are aligned, along the Y direction, on each of the respective print heads 5 at a resolution of 1200 dpi. Unshown ink paths communicate with each of the nozzles n, and ink supplied by capillary action forms meniscuses on the near side of the ejection ports. An electro-thermal transducer, for local heating of ink, is provided inside each ink path. By the application of a voltage pulse to an electro-thermal conversion element, according to an ejection signal, film boiling is generated inside the ink and ink is ejected as drops from each of the ejection ports by that bubble forming energy.

Figure 3:
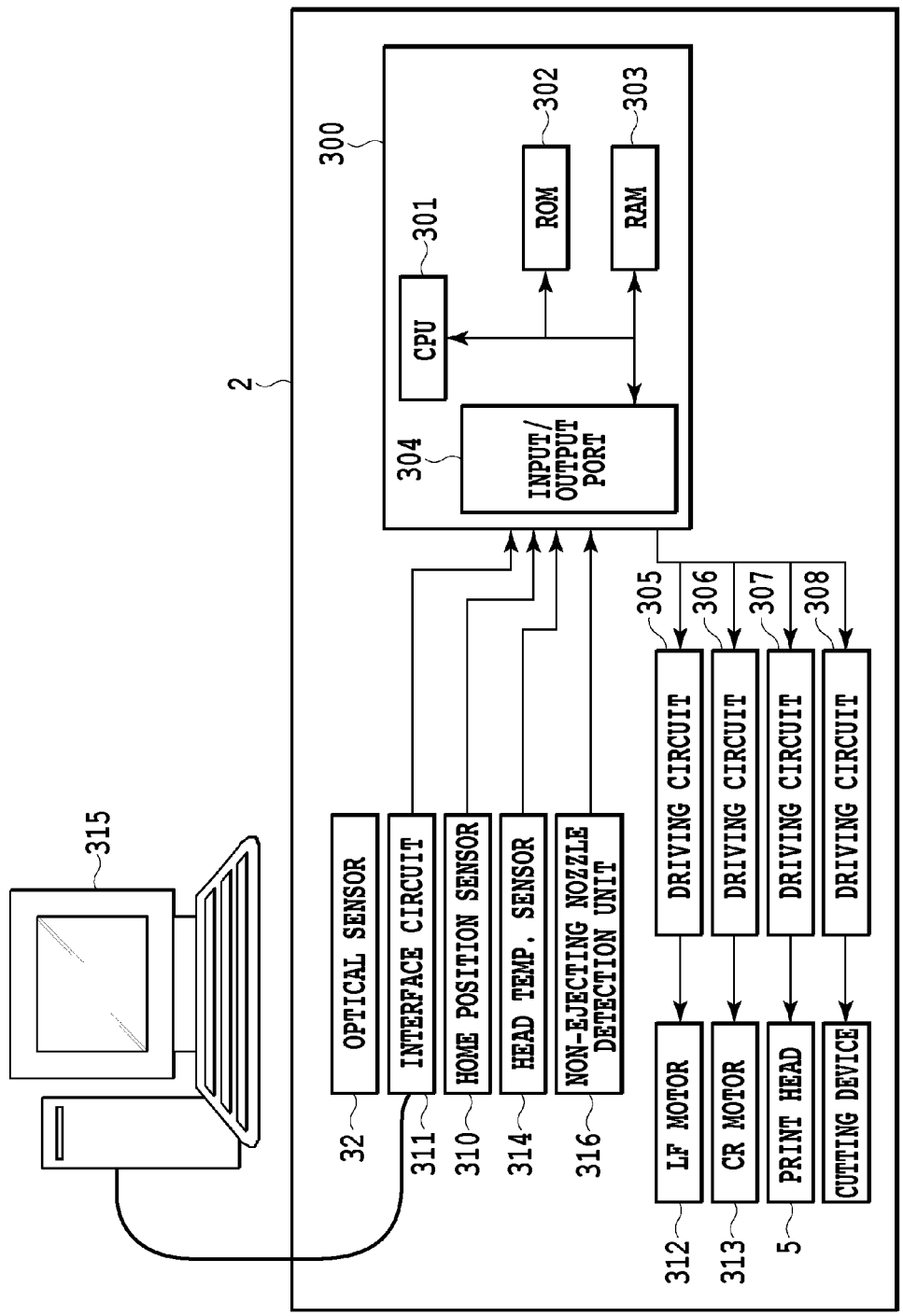
FIG. 3 is a block diagram showing the control structure of an inkjet printing apparatus.

FIG. 3 is a block diagram illustrating the structure of the control system of the inkjet printing apparatus 2 of the embodiment. The main control unit 300 is provided with a CPU 301 that executes process operations relating to calculation, selection, discrimination and control, etc., a ROM 302 that stores control programs, etc., that are to be executed by the CPU 301, a RAM 303 that is used as a print data buffer, etc., and an input/output port 304. Driving circuits 305, 306, 307 and 308, for the conveyance motor (LF motor) 312, carriage motor (CR motor) 313, print head 5 and the cutoff device, respectively, are connected to the input/output port 304. Various types of sensors are also connected to the input/output port 304. For example, a head temperature sensor 314 that detects the temperature of the print head, a home position sensor 310 that detects when the carriage 1 is at the location of the home position, and a ejecting failure nozzle detecting unit 316 that detects the ejection status of the print head 5, are connected. Furthermore, the main control unit 300 is connected to the host device 315 via the interface circuit 311.

The image processes executed by the host device 315 and the CPU 301 of the inkjet printing apparatus 2, of this embodiment, will be briefly explained next. The inkjet printing apparatus 2 of this embodiment is a binary printing apparatus that prints an image according to (1) or (0) data that respectively indicate whether a dot is to be printed (1) or whether a dot is not to be printed (0). Accordingly multi-value image data created by host device applications is converted to binary data corresponding to black (K), cyan (C), magenta (M) and yellow (Y). In this embodiment the multi-value (RGB) image data to be printed is first converted, by a printer driver installed in the host device 315, into 600 dpi multi-value (KCMY) data corresponding to the ink used by the printing apparatus.

Figure 4:
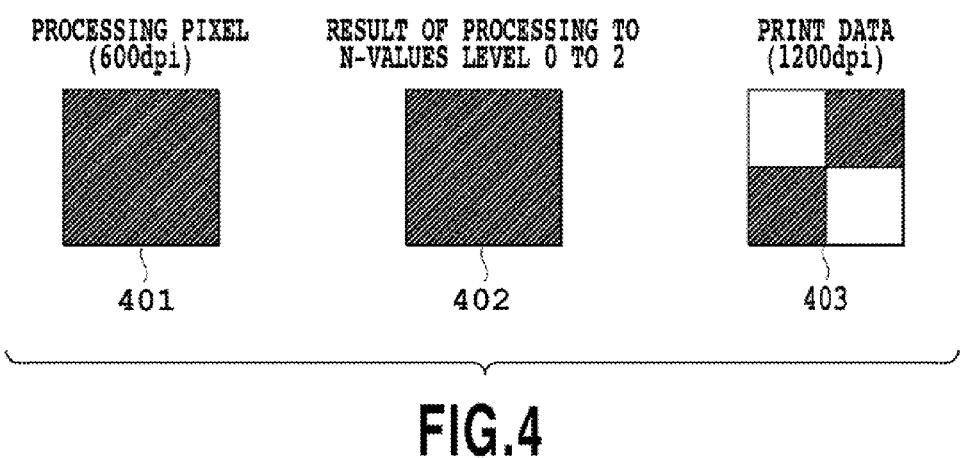
FIG. 4 is a schematic view showing the image data conversion process executed by a host apparatus and a printing apparatus.

FIG. 4 is a schematic view for explaining the image data conversion process executed by the host device 315 and the CPU 301 of the printing apparatus. In the FIG. 401 denotes data for one pixel of 600 dpi generated at the printer driver of the host device 315. As for image data at this level, for example, 256 gradations are expressed by 8 bits, and several data for kind of inks (K, C, M, Y) are prepared.

After that the printer driver performs a multi-value quantization process, with respect to such image data 401, for each ink color, and converts it to 3 value data (K, C, M, Y) 402 in which levels 0 to 2 are expressed by 2 bits, for example. The image data 402 is transmitted to the printing apparatus 2 in such a state.

The CPU 301 of the printing apparatus 2 converts the received image data 402 into 1200 dpi binary data 403 by referencing an index pattern stored in advance at the ROM 302. As for the index pattern, areas corresponding to one 1200 dpi pixel are arranged in a 2×2 configuration, and print (1) or non-print (0) is defined at each area according to input data of 0 to 2 level. The CPU 301, by referencing the index pattern, converts the received image data 402 of 600 dpi into 1200 dpi binary data, and stores it in the RAM as raster data for each ink color.

When the binary data of each color are accumulated CPU 301 performs the printing operation by controlling various driving circuits according to programs stored in the ROM 302. Here, in this embodiment, in order to maintain the moving velocity of the carriage at a high speed, multi-pass printing method is employed, wherein printing is performed by dividing data for an area that is capable of being printed in 1 print scan into 2 print scans of the print head.

Generally, at each of the nozzles of the print head, after ink is ejected it takes an amount of time for ink to be refilled and for the normal meniscus to be formed. The ejection frequency of the print head is set with this time as the cycle, but with the increase in printing resolution in recent years there has been an inability to move the carriage at a suitable speed. Hence the multi-pass printing method of this embodiment is one wherein, ejecting operation is performed at intervals of print pixels of 1200 dpi while keeping the ejection frequency of the print head is constant, the carriage scanning speed at each of the print scans is set to be high speed. In the multi-pass printing method multiple scans are performed at the same area of the print medium because only data corresponding to a number of pixels is printed during a single print scan.

First Embodiment

In the multi-pass printing method of a first embodiment a two column culling method is executed, which prints the data of every other pixel at a single print scan. Here, a 600 dpi image is printed by 2 print scans at the same image region of the print medium.

Figure 5:
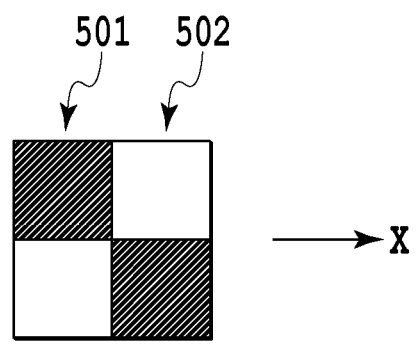
FIG. 5 is a drawing for explaining the classification of columns of 1 index pattern.

FIG. 5 is a drawing to explain the column classification in one index pattern for the two column culling. In the two column culling method the left side of an individual index pattern corresponds to odd number column data 501 and the right side to even number column data 502.

Figure 6:
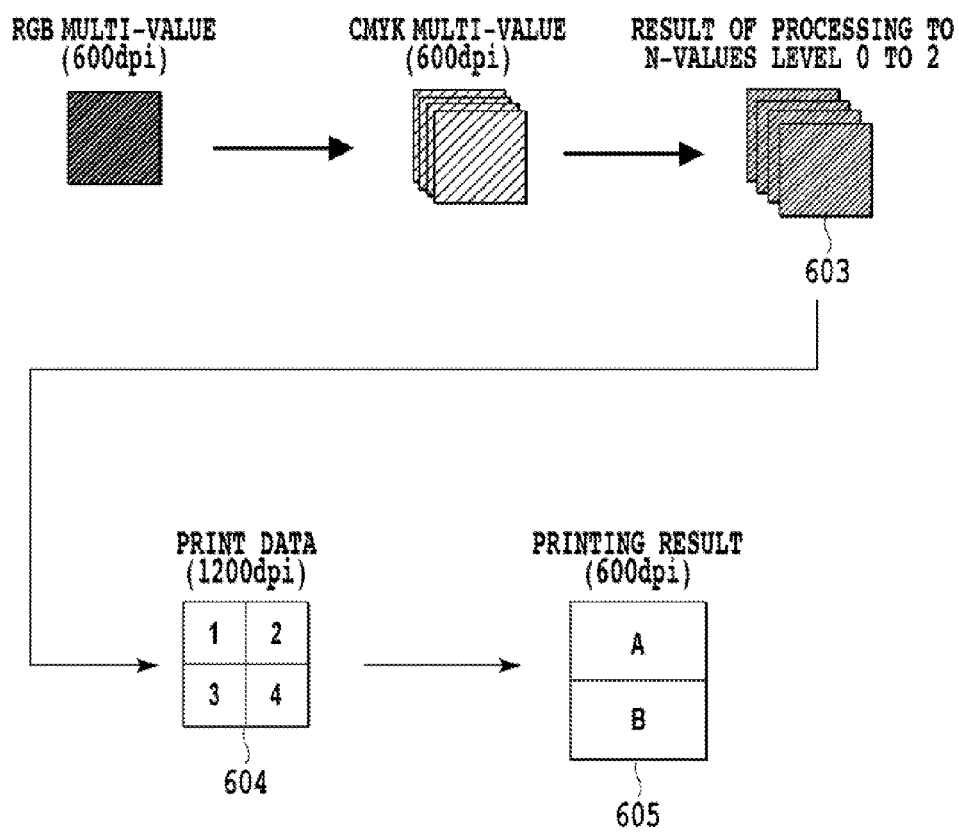
FIG. 6 is a schematic view that illustrates image processing and print configuration with respect to one 600 dpi pixel.

FIG. 6 is a schematic view that illustrates image processing and print configuration with respect to one 600 dpi pixel. The CPU 301 of the printing apparatus 2 converts the 600 dpi three value data 603, received from the host device, into 1200 dpi binary data 604 by referencing an index pattern stored in advance at the ROM 302. This binary data 604 becomes print data for the actual ejection of ink by the print head. 1 and 3 are areas that store odd numbered column data and 2 and 4 are areas that store even numbered column data. A case will be considered here where bi-directional printing is performed wherein print scans for odd numbered column data and print scans for even numbered column data are sequentially repeated while employing a two column culling method. Thereupon if odd numbered column data stored at areas 1 and 3 are printed at the forward scan, the even numbered column data stored at areas 2 and 4 are printed at the backward scan. Likewise, odd numbered column data stored at areas 1 and 3 are printed at the backward scan, the even numbered column data stored at areas 2 and 4 are printed at the forward scan.

Because printing of both the forward printing scan and the backward printing scan are performed at a resolution of 600 dpi, data stored at area 1 and data stored at area 2 are landed at the same location on the print medium, illustrated by A of 605. Likewise, data stored at area 3 and data stored at area 4 are landed at the same location on the print medium, illustrated by B of 605. That is, in the case where the data of both areas 1 and 2 are set to print (1), dots are printed at the landing location A during both directions of printing, but in the case where one of areas 1 and 2 is set to print (1) and the other is set to no printing (0), dots are printed at the landing location A during one printing direction.

In this embodiment a special index pattern is prepared by using such a relationship between two column culling and the index pattern. More concretely, an index pattern on which print (1) data exists at both the odd numbered column and the even numbered column is preferentially used with respect to data in which color unevenness is not feared, in order that dots are printed at both the forward scan and the backward scan. On the other hand, an index pattern on which print data (1) exists at only one of the odd numbered column and even numbered column is preferentially used with respect to data in which color unevenness is feared, in order that dots are printed at only one of the forward scan and the backward scan. By proceeding as such dots are printed by bi-directional printing with respect to data in which color unevenness is not feared, but dots are printed by one-directional printing with respect to data in which color unevenness is feared.

Figure 7A:
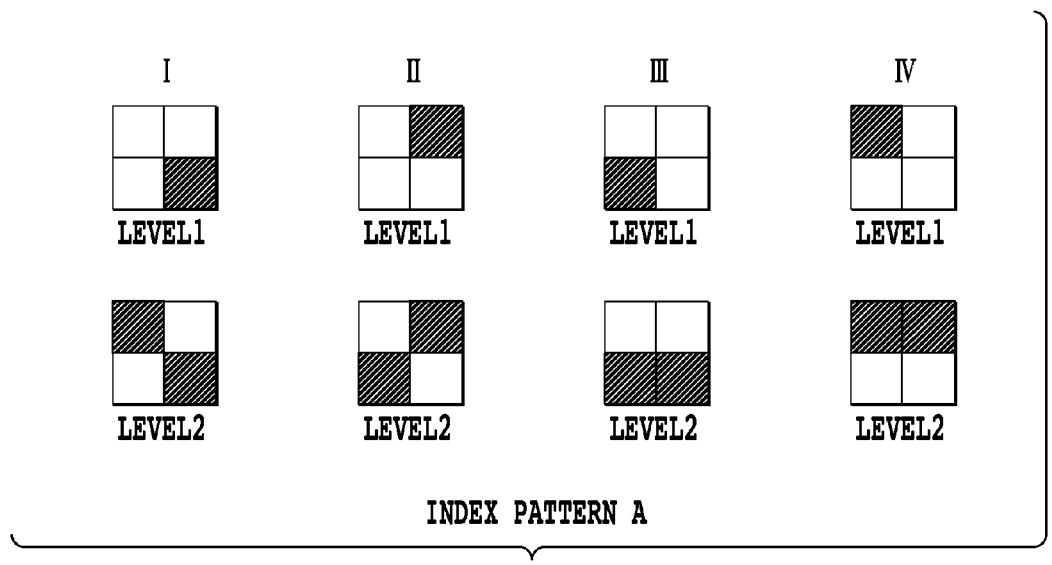
FIGS. 7A and 7B are drawings that illustrate one example of an index pattern group.
Figure 7B:
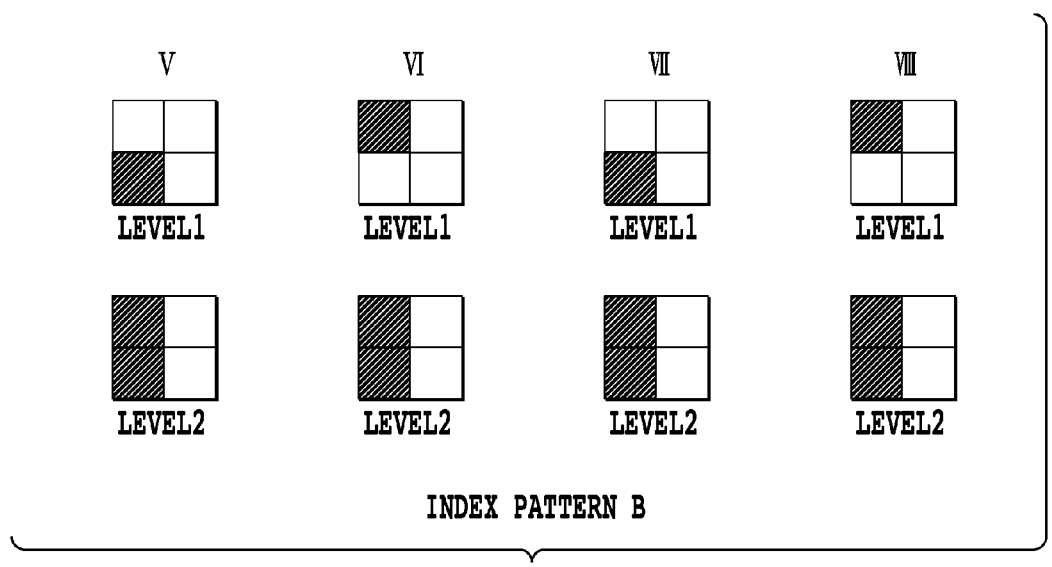

FIGS. 7A and 7B are drawings that illustrate one example of an index pattern group used in this embodiment. Among the 2×2 areas, the areas that are illustrated with black denote areas at which dots are printed, and the areas that are illustrated with white denote areas at which a dot is not printed. FIG. 7A illustrates an index pattern group A for printing areas in a 600 dpi pixel in both directions and FIG. 7B illustrates an index pattern group B for printing areas in a 600 dpi pixel in one direction. In this embodiment index patterns corresponding to level 0 to level 2 are prepared because the CPU 301 receives 600 dpi image data expressed as 0 to 2 levels. Note that level 0 is not shown here because all of the 2×2 areas are non-print (0) areas at level 0 with either pattern.

At the index pattern group A, four classes of patterns, (I) to (IV), are prepared with respect to level 1 and level 2. Likewise, at the index pattern group B, four classes of patterns, (V) to (VIII), are prepared with respect to level 1 and level 2. In the case where the index pattern group A is set the CPU 301 selects one pattern from among patterns (I) to (IV). On the other hand, in the case where the index pattern group B is set the CPU selects one pattern from among patterns (V) to (VIII).

The index pattern group A has been configured such that data indicating print (1) is arranged the even numbered column and the odd numbered column uniformity. For example, in the case where level 1 is continuous, by way of the four classes of patterns (I) to (IV) being arranged alternately, data expressing print (1) is divided among even numbered and odd numbered columns. With respect to level 2, in all of the patterns one data expressing print (1) is arranged at both of the odd numbered columns and even numbered columns.

On the other hand, the index pattern group B has been configured such that data indicating print (1) is arranged only at the odd numbered columns. With respect to level 1 and level 2, even if any of the patterns (V) to (VIII) is selected data expressing print (1) will be arranged at the odd numbered column. In this embodiment the CPU 301 selects one pattern group from among such two characteristic index pattern groups A and B, according to image data.

Figure 8:
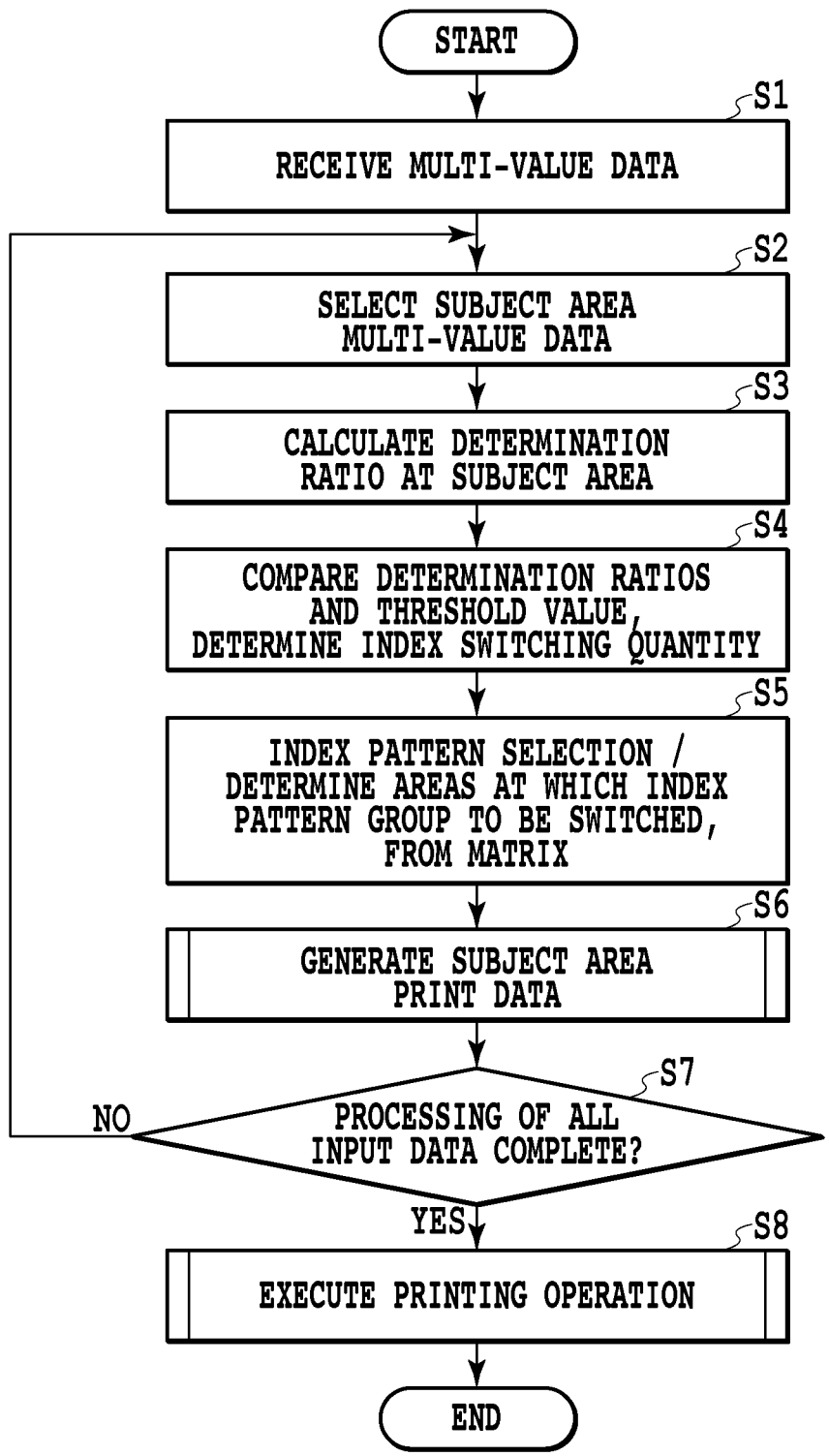
FIG. 8 is a flowchart for explaining the process that occurs when a multipass printing method is executed.

FIG. 8 is a flowchart for explaining the process that the CPU 301 executes when it performs the multi-pass printing in two column culling method. When the process is started the CPU 301, first at step S1, stores multivalue image data received from the host device in the RAM 303. In this embodiment the image data received from the host device is CMYK data having 0 to 255 values, and here the input value of cyan at each pixel is denoted by Vc, the input value of magenta is denoted by Vm, the input value of yellow is denoted by Vy, and the input value of black is denoted by Vk.

At step S2 the CPU 301 picks out one subject area, comprising a prescribed area (8 horizontal pixels×4 vertical pixels), from among the stored image data.

Next, the CPU detects the image data contained in the selected subject area, and calculates a ratio determination value S (step 3). In this embodiment the ratio determination value S is obtained as described below.

First, with respect to each of the pixels contained within the 8 horizontal pixel×4 vertical pixel area, a conversion value Kn (n=1 to 32) is obtained according to equation 1:

$$Kn=(Nc \times Vc)+(Nm \times Vm)+(Ny \times Vy)+(Nk \times Vk) \qquad \text{(equation 1)}.$$

In the above equation Nc, Nm, Ny and Nk are weighting coefficients for cyan, magenta, yellow and black, respectively, which are values that are set in advance, taking into account the degree of influence of each ink color for color unevenness. For example, in the case where color unevenness due to cyan ink stands out the most and where color unevenness due to black ink does not stand out much, the weighting coefficients can be set such that Nc=1.3, Nm=1.0, Ny=1.5 and Nk=0.7. Next, the ratio determination value S of the subject area is calculated as the average value of the 32 conversion values Kn (n=1 to 32):

$$S=\Sigma Kn/32 \qquad \text{(equation 2)}.$$

As an example a case will be considered where, among 32 pixels contained in the subject area, 16 pixels exist where Vc, Vm, Vy, and Vk equal 210, 128, 32 and 16, respectively, and 16 pixels exist where Vc, Vm, Vy and Vk equal 160, 100, 128 and 64, respectively. Here, using equation 1, equation 2 and the weighting coefficients above, the ratio determination value S equals 502.

When the ratio determination value S of the subject area is obtained at step 3, the process proceeds to step S4, and the calculated ratio determination value S is compared with a threshold table stored in advance in the ROM 302.

FIG. 9 is a drawing that illustrates the threshold table referenced at step S4. The CPU 301 compares the calculated ratio determination value S with 32 ratio switching threshold values, and obtains the index switching quantity shown in the rightward column. For example, in the case where the ratio determination value S is 502, because th14<S<th15 the index switching quantity becomes 15.

Next, the CPU 301 references the index pattern selection matrix stored in the ROM 302 and determines, from among a prescribed area, the pixels to replace the index pattern (step S5). In the initial setting of this embodiment is such the index pattern group A is set for all pixels. At step 5 only specified pixels are switched from the index pattern group A to the index pattern group B.

FIGS. 10A and 10B are drawings that illustrate one example of an index pattern selection matrix stored in the ROM 302. The size of the index pattern selection matrix corresponds to the size of the subject area, and comprises an 8 horizontal pixel×4 vertical pixel. The numbers shown at the areas corresponding to each of the pixels are threshold numbers for comparison to the index switching quantity obtained at step 4. If the index switching quantity is equal to or higher than the threshold number the index pattern group A is switched to the index pattern group B. On the other hand, if the index switching quantity is smaller than the threshold number the index pattern group A remains as is. As an example, in the case where the index switching quantity is 16, the index pattern group B is set at pixels where the threshold number is 0 to 15 while the index pattern group A is set at pixels where the threshold number is 16 to 31. At FIG. B, in a case such as this, pixels that have been switched to the index pattern B are shown with hatching.

Returning again to FIG. 8, at the following step S6, the CPU 301, by referring to the index patterns shown at FIGS. 7A and 7B, performs an index development with respect to all of the pixels contained in the subject area, and generates binary data corresponding to the subject area.

Figure 11:
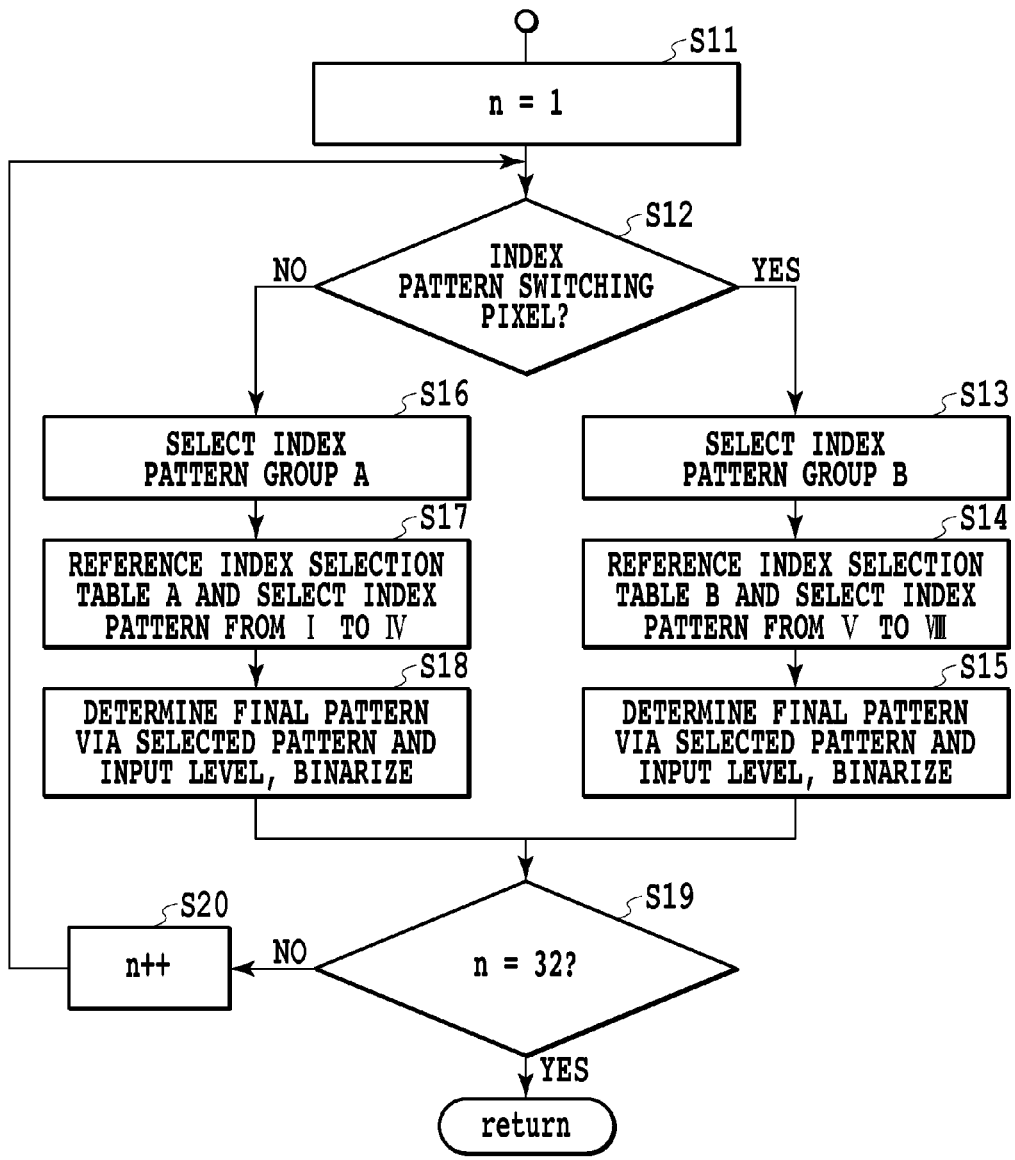
FIG. 11 is a flowchart for explaining the index development process of step S6.

FIG. 11 is a flowchart for concretely explaining the index development process executed by the CPU 301 at step S6 above.

When this process is started the CPU 301, first at step S11, sets one pixel among the 32 pixels comprising the subject area as the subject pixel (n=1). Next at step S12 it is judged whether the subject pixel was determined at step 5 to be a pixel at which the index pattern is to be switched. In the case where it has been determined it is a pixel at which the index pattern will be switched, the process proceeds to step S13 and the index pattern group B shown at FIG. 7B is set with respect to the aforementioned subject pixel. On the other hand, in the case where it has been determined that it is not a pixel at which the index pattern will be switched, the process proceeds to step S16 and the index pattern group A shown at FIG. 7A is set with respect to the aforementioned subject pixel. Next, at step S14 or step S17, the index selection table stored in advance in the ROM 302 is referenced, and 1 pattern is selected from among either the plurality of patterns (I) to (IV) or from among the plurality of patterns (V) to (VIII), prepared at the respective index pattern groups.

FIGS. 12A and 12B are drawings that illustrate an example of an index selection table referenced by the CPU 301 at step S14 or step S17. Explained more concretely, at step S14, by referencing the index selection table group B shown at FIG. 12B, one pattern is selected from among the patterns (V) to (VIII) according to the pixel position of the subject pixel of the subject area. For example, in the case where the subject pixel is located at the upper left of the subject area pattern (V) is selected, and in the case where the subject pixel is located at the lower right of the subject area pattern (VIII) is selected. On the other hand, at step 17, by referencing the index selection table group A shown at FIG. 12A, one pattern is selected from among the patterns (I) to (IV) according to the pixel position of the subject pixel of the subject area. For example, in the case where the subject pixel is located at the upper left of the subject area pattern (I) is selected, and in the case where the subject pixel is located at the lower right of the subject area pattern (IV) is selected. In this manner, by preparing a plurality of patterns in advance and determining the arrangement of dots using an index selection table such as that shown at FIG. 12 or FIG. 12B, a specific dot arrangement does not repeat and it is possible to limit the occurrence of texture.

Furthermore, at step S15 and step S18, the final 2×2 index pattern is determined from the pattern set at step S14 or step S17 and the level value of the subject pixel. Using this, the CPU 301 develops the multivalue data of level 0 to 2 of the subject pixel into binary data.

When the development, at step S15 or step S18, of the data of the subject pixel into binary data has been completed, the CPU 301 proceeds to step S19 and judges whether index development has been completed with respect to all pixels contained within the subject area. In the case where it is judged that index development has been completed with respect to all of the pixels the process is terminated and the CPU 301 returns to the flowchart of FIG. 8. In the case where it is judged that pixels remain that should be processed, the parameter n, for indicating the subject pixel, is incremented, and the CPU 301 returns to step S12 for processing the next subject pixel.

Returning to FIG. 8, when index development of the subject area at step S6 has been completed, the CPU 301 proceeds to step S7, and it is judged whether index development has been completed with respect to all of the image data received at step S1. In the case that it is judged that areas remain that should be processed, the CPU 301 returns to step S2, and the aforementioned process is repeated with respect to the next subject area. On the other hand, in the case that it is determined that index development has been completed with respect to all of the pixel data, the CPU 301 proceeds to step S8 and performs a printing operation with respect to the image data received at step S1. With this the process is terminated.

FIGS. 13A to 13F are drawings for concretely explaining the printing state, in a case of printing an image in accordance with the series of processes explained above. FIG. 13A illustrates one example of image data input from the host device; the individual squares indicate areas A to P, each comprising 600 dpi input pixels aligned in a 4 vertical pixel×8 horizontal pixel arrangement. Each of the areas A to P corresponds to a unit (a prescribed area) for determining the ratio between the index pattern group A and the index pattern group B, in this embodiment.

The determination values S obtained as a result of processing according to the flowchart of FIG. 8, and the index switching quantities obtained from the respective determination values S, are shown at areas A to P. In this example, at areas B, G and N, for example, the multivalue data values for each color are low, then referring to FIG. 9, the determination value S obtained from equation 1 satisfies the relationship S<(th0=32), and the index switching quantity is 0. Hence with respect to these areas the index pattern group A is used at all of the pixels.

On the other hand, at areas A, C, H, J and P, the determination value S obtained from equation 1 satisfies the relationship th15<S<th16, and thus the index switching quantity is 16. Accordingly with respect to these areas the index pattern group A is used at half of the pixels and the index pattern group B is used at half of the pixels.

Furthermore, at areas E, I, K and O, the determination value S obtained from equation 1 satisfies the relationship th31<S, and the index switching quantity is 32. Hence with respect to these areas the index pattern group B is used at all of the pixels.

Here, FIG. 13B illustrates print ratios during the forward scans at each of the areas A to P, and FIG. 13C illustrates the print ratios during the backward scans. As an example, the printing ratio of the forward scan may be calculated as "(50%×index pattern group A ratio inside the area)+(index pattern group B ratio inside the area)". And the printing ratio of the backward scan may be calculated as "(50%×index pattern group A ratio inside the area)". Hence at every area the sum of the print ratio at the forward scan and the print ratio at the backward scan is 100%.

As an example, at the areas B, G and N where the index pattern group A is used with respect to all pixels, the print ratio of both the forward scans and the backward scans are 50%. At the areas A, C, H, J and P where the index pattern group A are used at half of the pixels and the index pattern group B are used at half of the pixels, the print ratio at the forward scans are 25%+50%=75%, and the print ratio at the backward scans are 25%. At the areas E, I, K and O where the index pattern group B is used with respect to all pixels, the print ratio at the forward scans are 0%+100%=100%, and the print ratio at the backward scans are 0%.

FIG. 13D, similarly to FIG. 13A, is a diagram that illustrates print duty for image data entered from the host device. The print duty D can be calculated according to the following equation: $D=Vc/255+Vm/255+Vy/255+Vk/255$, by using input values Vc, Vm, Vy and Vk with values between 0 and 255.

FIG. 13E illustrates, among the print duties D of each area shown at FIG. 13D, print duties at the forward printing scan, which can be calculated as a product of print duty D and forward scan print ratio shown at FIG. 13B. On the other hand, FIG. 13F illustrates print duties at the backward printing scan, which can be calculated as a product of print duty D and backward scan print ratio shown at FIG. 13C.

According to FIGS. 13D to 13F, at areas at which print duty is comparatively low and at which color unevenness does not easily stand out, forward scan print duty and backward scan print duty are approximately the same. In contrast, at areas at which print duty is comparatively high and at which color unevenness stands out easily, the print duty of the forward printing scan is higher than the print duty of the backward print scan.

Figure 14A:
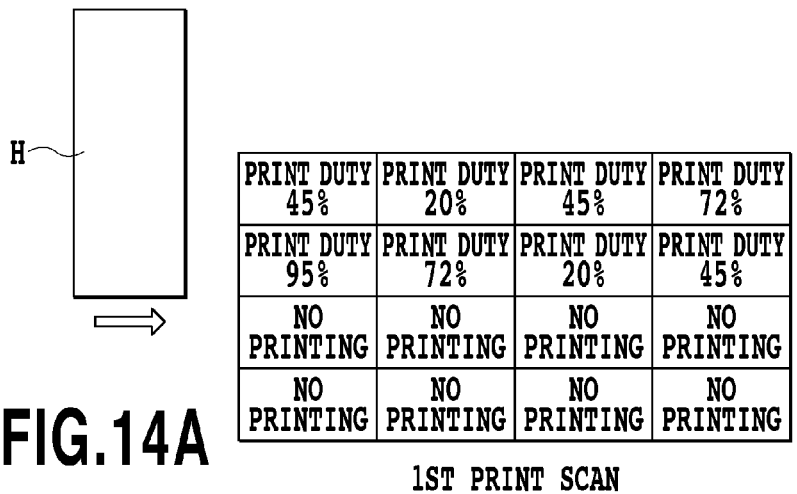
FIGS. 14A to 14C are drawings that show positional relationship between a print image and a print head.
Figure 14B:
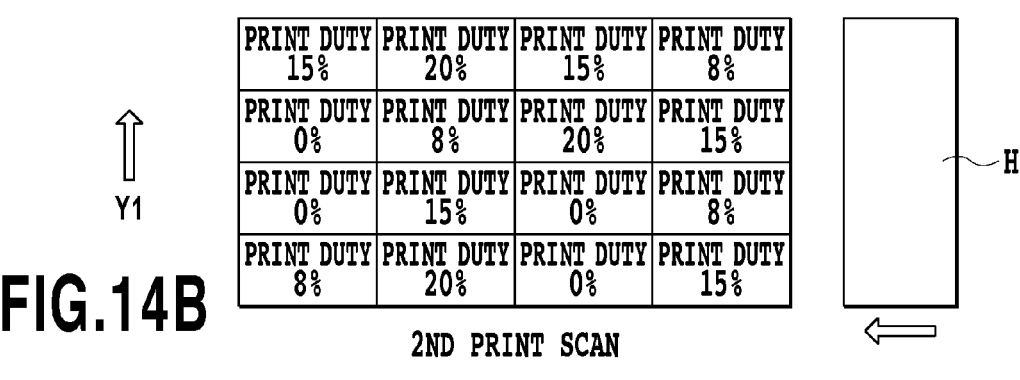
Figure 14C:
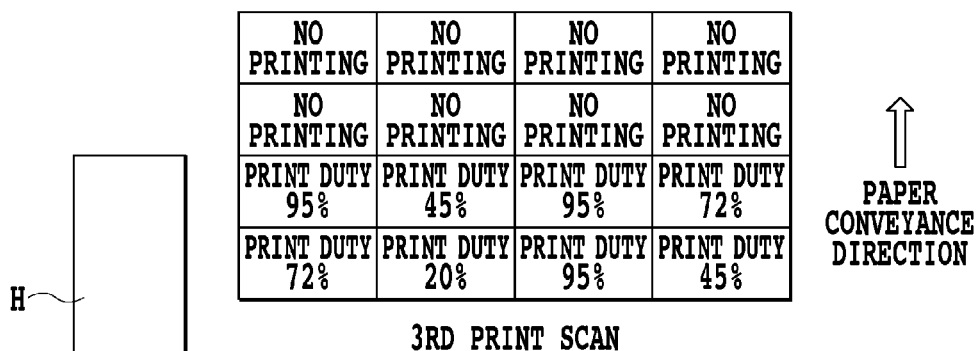

FIGS. 14A to 14C are charts that illustrate the positional relationship between the print image and the print head, in a case where a two column culling multipass printing has been performed in accordance with the print duties shown at FIGS. 13E and 13F. For the purpose of simplification explanation is made here using a print head H having 32 nozzles in the Y direction.

FIG. 14A illustrates a first printing scan. The first printing scan is performed by a forward scan of 16 nozzles at the lower half of the print head over the regions A to H at the upper half of the image. During the first print scan only odd-numbered columns are printed because it is a forward scan, and only the upper half of the image is printed according to the print duties shown at FIG. 13. After such a first printing scan the print medium is conveyed in the Y direction an amount corresponding to 16 nozzles.

FIG. 14B illustrates a second printing scan that is performed after the aforementioned conveyance operation. The second printing scan is performed by a backward scan of all 32 nozzles of the print head over the entire image region A to P. Because the second sprint scan is a backward scan only even numbered columns are printed, and an image is printed according to the print duties shown at FIG. 13F. The printing of areas A to H is completed by the first printing scan and the second printing scan. After such a second printing scan the print medium is again conveyed in the Y direction an amount corresponding to 16 nozzles.

FIG. 14C illustrates a third printing scan. The third printing scan is performed by a forward scan of 16 nozzles at the upper half of the print head over the image regions I to P, at which printing has not been completed. The third printing scan, similar to the first printing scan, is a printing scan for only odd numbered columns, and only the lower half of the image is printed according to the print duties shown at FIG. 13E. The printing of the lower half areas I to P is completed by the second print scan and the third print scan. The printing of all areas A to P is completed by such tree printing scans.

According to this embodiment as described above, an index pattern group A at which print data (1) is arranged evenly at both odd numbered columns and even numbered columns, and an index pattern group B at which print data (1) is arranged only at odd-numbered columns, are prepared. Additionally, the index pattern group A is more heavily allocated at areas at which color unevenness appears with difficulty, the index pattern group B is more heavily allocated at areas at which color unevenness appears easily, and an image is printed by a two column culling bi-directional multi-pass printing. According to such a configuration, for each predetermined area it is possible to suitably adjust the print ratio setting between the forward scan printing and the backward scan printing, according to the degree of color unevenness. As a result it is possible to reduce the occurrence of color unevenness with respect to the entire image, while achieving a high speed output owing to a bi-directional printing.

Second Embodiment

A second embodiment of the invention will be explained next. In this embodiment the inkjet printing apparatus shown at FIG. 1 to FIG. 3 is used. The image data received by the host device 315 of the CPU 301 of this embodiment, however, is 600 dpi (K, C, M, Y) data expressed by 5 values, level 0 to level 4. The CPU 301 converts this 600 dpi 5 value image data into 1200 dpi (vertical)×2400 dpi (horizontal) binary data.

Figure 15:
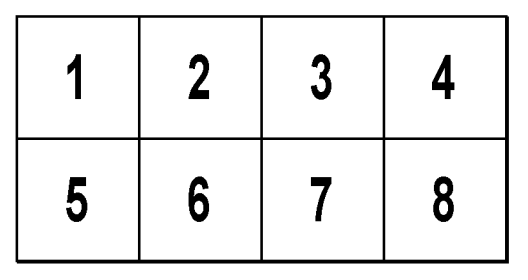

FIG. 15 is a diagram that illustrates the arrangement state of the areas that store binary data in this embodiment. Each square illustrates an area that corresponds to one pixel of 1200 dpi×2400 dpi. Here, 1, 3, 5 and 7 are areas that store odd numbered color data and 2, 4, 6 and 8 are areas that store even numbered column data. A case will be considered here where bi-directional printing is performed wherein print scans for odd numbered column data and print scans for even numbered column data are sequentially repeated while employing a two column culling method. Thereupon if odd numbered column data stored at areas 1, 3, 5 and 7 are printed at the forward scan, the even numbered column data stored at areas 2, 4, 6 and 8 are printed at the backward scan. By using such 4×2 index patterns, in the present embodiment it is possible to control the printing direction with respect to levels 0 to 4.

Figure 16A:
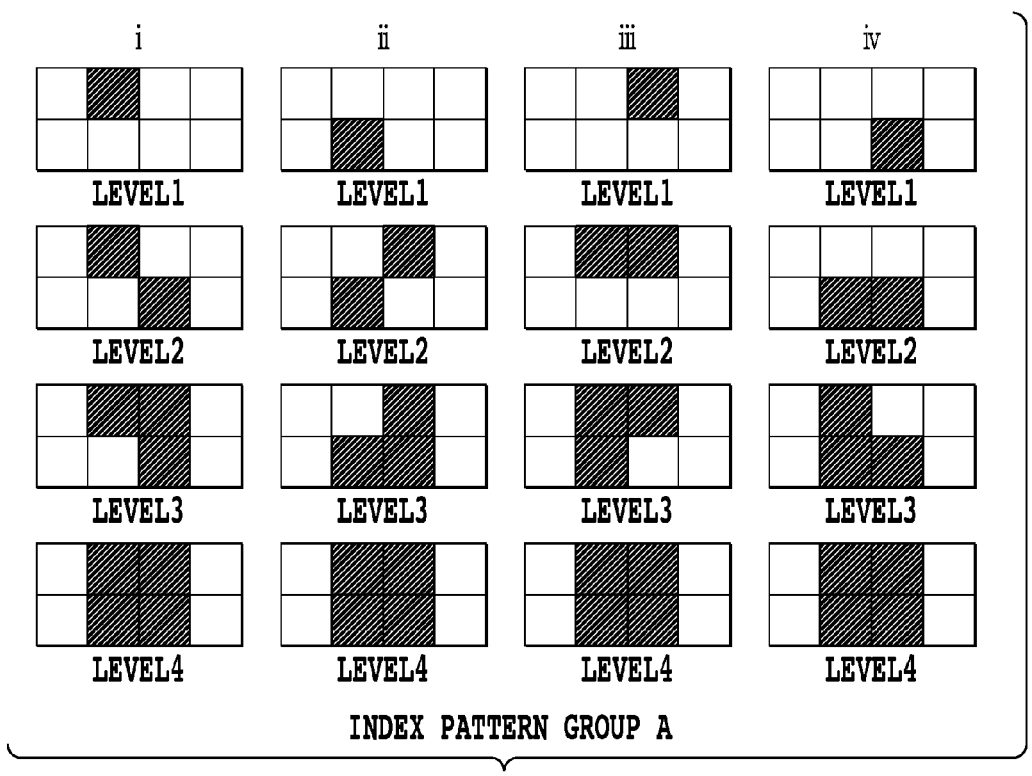
FIGS. 16A and 16B are drawings that illustrate index pattern groups of a second embodiment.
Figure 16B:
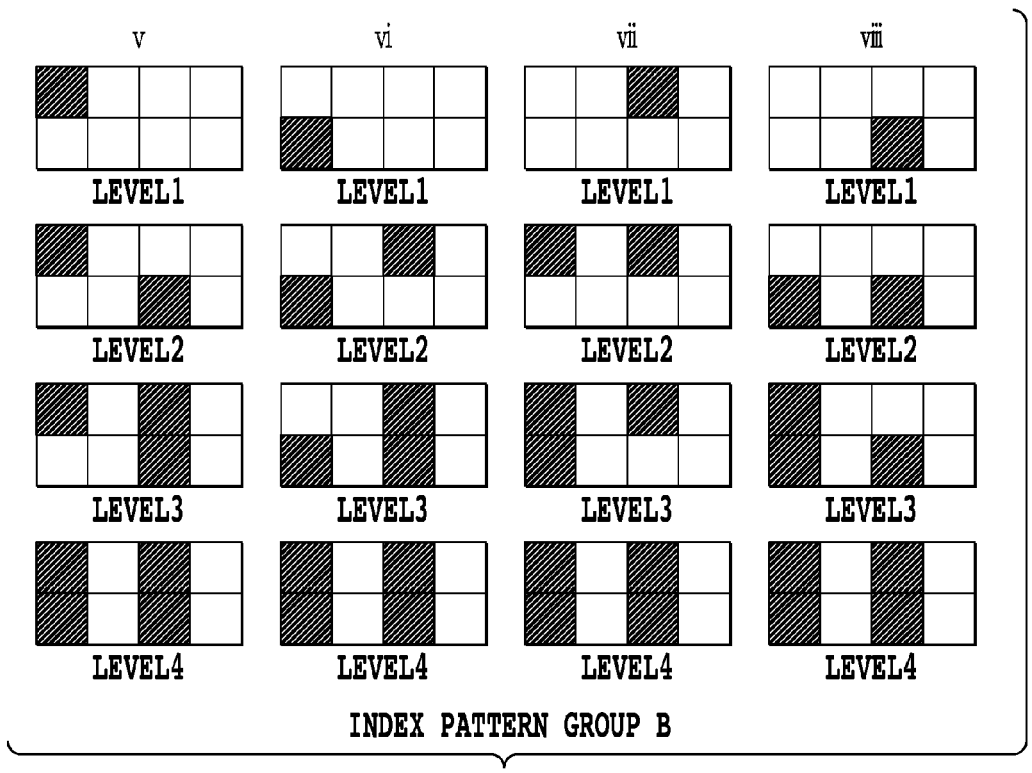

FIGS. 16A and 16B are one example of an index pattern group used in this embodiment. Among the 2×4 areas, the areas that are illustrated with black denote areas at which dots are printed, and the areas that are illustrated with white denote areas at which a dot is not printed. FIG. 16A illustrates an index pattern group A for printing areas in a 600 dpi pixel in both directions and FIG. 16B illustrates an index pattern group B for printing areas in a 600 dpi pixel in one direction. In this embodiment index patterns corresponding to level 0 to level 4 are prepared because the CPU 301 receives 600 dpi image data expressed as 0 to 4 levels.

At the index pattern group A, four classes of patterns, (i) to (iv), are prepared with respect to all levels. Likewise, at the index pattern group B as well, four classes of patterns, (v) to (viii), are prepared with respect to all levels.

The index pattern group A has been configured such that data indicating print (1) is arranged the even numbered column and the odd numbered column uniformity. In contrast, the index pattern group B has been configured such that the data indicating print (1) is arranged only at the odd numbered columns.

In this embodiment as well it is possible to perform an index development process according to the flowcharts shown at FIG. 8 and FIG. 11. Accordingly, by performing a 2 column culling multi-pass printing operation such as that shown at FIGS. 14A to 14C, for each predetermined area it is possible to suitably adjust the ratio between forward scan printing and backward scan printing, according to the degree of color unevenness. As a result it is possible to reduce the occurrence of color unevenness with respect to the entire image, while achieving a high speed output owing to a bi-directional printing.

Furthermore, in this embodiment it is possible to control the printing ratio between the forward scan and the backward scan for the five levels: level 0 to level 4 respectively. Accordingly print ratio control that is of a higher precision than that of the first embodiment described above is possible.

Third Embodiment

A third embodiment of the invention will be explained below. In this embodiment as well, using the inkjet printing apparatus shown at FIG. 1 to FIG. 3, index development is performed according to the flowcharts shown at FIG. 8 and FIG. 11. In this embodiment, however, the threshold table that is referenced when determining the calculation method of the determination value S and the index switching quantity differs from the above described embodiments.

In the previously explained first and second embodiments the determination value $K_n$, which expresses the degree of color unevenness, is obtained according to equation 1. Regarding equation 1, weighting coefficients are used for each ink color, based on the degree of contribution to color unevenness, but ultimately it is a value based on the sum of the print duties of each of the ink colors. That is, it is determined that color unevenness stands out more easily as print duty becomes higher, and the one-direction printing ratio is set higher as the print duty of the area becomes higher.

There are many cases, however, where the color unevenness that can be actually perceived visually is influenced more by hue than by the print duty. Thus in the present embodiment a determination value T, for expressing the degree of color unevenness, is calculated not from CMYK print duty, but rather from a combination of multivalue luminance data (RGB). For this, the printing apparatus of this embodiment acquires 600 dpi image data of 8 bit having 256 gradations from the printer driver of the host device 315.

FIG. 17A is a chart for diving each RGB signal value, having a value between 0 and 255, into four subdivisions. The signal value range 192 to 255 belong subdivision A, the signal value range 128 to 191 belong subdivision B, the signal value range 64 to 127 belong subdivision C, and the signal value range 0 to 63 belong subdivision D.

In this embodiment the CPU 301, by referencing the hue matrix chart shown at FIG. 17B, acquires a determination value Tn (n=1 to 32) for each 600 dpi pixel according to the combination of each of the RGB color subdivisions. Each of the 3 RGB colors is divided into four subdivisions, and there are 64 combinations. The way that color unevenness stands out varies according to the respective combinations, and the determination value Tn is set in advance by checking the degree of color unevenness of each combination. Next, the CPU 301 calculates the ratio determination value S of the subject area, comprised of 32 pixels, by averaging the 32 conversion values Tn (n=1 to 32).

$$S = \Sigma T/32 \qquad \text{(equation 3)}.$$

FIG. 17C is a diagram that illustrates a threshold value table that the CPU 301 references for setting the index switching quantity. The CPU 301 compares the ratio determination value S calculated according to equation 3 with 32 ratio switching threshold values, and determines the index switching quantity shown in the rightward column. As an example a case will be considered where, among 32 pixels contained in the subject area, 16 pixels exist where R, G, and B equal 200, 150 and 50, respectively, and 16 pixels exist where R, G and B equal 150, 50 and 150, respectively. Here, using FIGS. 17A, 17B and equation 3, the ratio determination value S is 27. Next, when the threshold table shown at FIG. 17C is referenced, because the obtained ratio determination value S (27) satisfies the relationship th14<S<th15, the index switching quantity becomes 15. The subsequent processes are the same as the other embodiments described above.

As described above in this embodiment it is possible to determine the degree of color unevenness of a subject pixel or a subject area according to the hue of each area (that is, according to the RGB combination). According to such a configuration, it is possible to adjust, according to the hue of a predetermined area, the ratio between the forward scan printing and the backward scan printing to a more suitable ratio. As a result it is possible to reduce the occurrence of color unevenness with respect to the entire image, while achieving a high speed output owing to a bi-directional printing.

Other Embodiments

With respect to the embodiments described above a method that ejects ink using an electro-thermal conversion element was explained but the invention is also capable of employing a method that ejects ink using an electro-mechanical conversion element such as a piezoelectric, etc.

Additionally, the size of the subject area, the determination value calculation method, the concrete contents of the index pattern, and the threshold table described at the embodiments above do not limit the invention. All configurations in which it is possible to control the proportion of one-directional printing and the proportion of bi-directional printing, with respect to a plurality of pixels comprising a predetermined image area, according to the degree of color unevenness in the predetermined area, are within the scope of the invention. As an example, it is possible to prepare memories for forward scans and backward scans separately in advance, and generate print data by allocating binary data which has been binarized directly to the respective memories according to the mulitvalue image data and determination value of each area.

The inkjet printing apparatus was described above as functioning as the data processing apparatus of the invention. The invention is not so limited, however. For example, the invention may take a form wherein the above described image process sequence is performed by a print driver of the host device, and the printing apparatus respectively receives binary data for the forward scan and binary data for the backward scan. In this case the host device becomes the data processing apparatus of the invention.

Additionally, the invention may be implemented by program code that executes the protocol of the flowchart shown at FIG. 11 and implements the functions of each of the above described embodiments or a storing medium that stores the program code. The invention may also be achieved by a system or a computer device (or a CPU or MPU) that reads out and executes program code stored on a storing medium. In this case, by way of the program code itself read out from the storing medium implementing the functions of the above described embodiments, the storing medium on which the program code is stored comprises the invention.

Such program can be provided also by downloading of program code of the invention itself or a compressed file that contains functions that install automatically, from a home page connected to the internet using a browser of a client computer. Delivery may also be implemented by dividing the program code comprising the program of the invention into multiple files and downloading each of the files from different homepages. That is, a World Wide Web server that causes a program file, for executing a functional processes of the invention on a computer, to be downloaded to multiple users is also contained within the scope of the invention.

In addition to executing a program read out by a computer and implementing the functions of the above described embodiments, an Operating System that operates on a computer according to that program may perform all or a part of the actual process, and the functions of the above described embodiments carried out by that process.

While the present invention has been described with reference to exemplary embodiments, it is to be understood that the invention is not limited to the disclosed exemplary embodiments, and that numerous modifications to, and equivalent structures and functions thereof may be employed within the scope of the invention. The scope of the following claims is to be accorded the broadest interpretation so as to encompass all such modifications and equivalent structures and functions.

This application claims the benefit of Japanese Patent Application No. 2011-093064, filed Apr. 19, 2011, which is hereby incorporated by reference herein in its entirety.

What is claimed is:

1. A data processing apparatus for printing an image of a predetermined area on a print medium by a plurality of overlapping printing scans with respect to the predetermined area including a forward scan and a backward scan of print heads that eject a plurality of colors of inks respectively, based on print data, the data processing apparatus comprising:
- a unit configured to prepare a mode A in which dots will be printed evenly by both of the forward scan and the backward scan in an area corresponding to a pixel and a mode B in which dots will be printed only by the forward scan or the backward scan in an area corresponding to a pixel;
- a print ratio setting unit that sets the number of pixels to which mode A is allocated and the number of pixels to which mode B is allocated in the predetermined area comprising a plurality of pixels based on the multi-value image data of the plurality of pixels such that a ratio of the number of pixels allocated to mode B to the number of pixels allocated to mode A becomes greater as a degree of color unevenness due to an order of applying ink on the print medium, that can occur about the predetermined area by printing based on the multi-value image data, becomes larger; and
- a print data generation unit that generates the print data for the forward scan at the predetermined area and the print data for the backward scan at the predetermined area by allocating mode A or mode B to each of the plurality of pixels of the predetermined area based on the number set by the print ratio setting unit.

2. The data processing apparatus according to claim 1, wherein the print data generation unit converts the multi-value image data of a pixel that is allocated to mode A into binary data corresponding to a plurality of areas, each of which prints one dot, by using an index pattern in which print data is arranged such that dots will be printed evenly by both of the forward scan and the backward scan and converts the multi-value image data of a pixel that is allocated to mode B into binary data corresponding to a plurality of areas, each of which prints one dot, by using an index pattern in which print data is arranged such that dots will be printed only by the forward scan or the backward scan.

3. The data processing apparatus according to claim 1, wherein the color information is signal values that are calculated from a plurality of signals of the multi-value image data, each corresponding to the plurality of colors of inks respectively, and corresponds to the amount of each of the plurality of inks printed at the predetermined area.

4. A data processing apparatus according to claim 1 wherein said print ratio setting unit sets, from said multi-value image data of said plurality of pixels, sets said print ratio of said forward scans and said print ratio of said backward scans at said predetermined area based on the hue of the image printed at said predetermined area.

5. The data processing apparatus according to claim 1, wherein the multi-value image data is CMYK data.

6. The data processing apparatus according to claim 1, wherein the plurality of overlapping printing scans with respect to the predetermined area includes a plurality of forward scans and a plurality of backward scans of print heads.

7. The data processing apparatus according to claim 1, wherein the print ratio setting unit sets the number of pixels to which mode A is allocated and the number of pixels to which mode B is allocated in the predetermined area based on the entire multi-value image data of the plurality of pixels.

8. An inkjet printing apparatus for printing an image of a predetermined area on a print medium by a plurality of overlapping printing scans with respect to the predetermined area including a forward scan and a backward scan of print heads that eject a plurality of colors of inks respectively, based on print data, the inkjet printing apparatus comprising:
- a unit configured to prepare a mode A in which dots will be printed evenly by both of the forward scan and the backward scan in an area corresponding to a pixel and a mode B in which dots will be printed only by the forward scan or the backward scan in an area corresponding to a pixel;
- a print ratio setting unit that sets the number of pixels to which mode A is allocated and the number of pixels to which mode B is allocated in the predetermined area comprising a plurality of pixels based on the multi-value image data of the plurality of pixels such that a ratio of the number of pixels allocated to mode B to the number of pixels allocated to mode A becomes greater as a degree of color unevenness due to an order of applying ink on the print medium, that can occur about the predetermined area by printing based on the multi-value image data, becomes larger;
- a print data generation unit that generates the print data for the forward scans at the predetermined area and the print data for the backward scans at the predetermined area by allocating mode A or mode B to each of the plurality of pixels of the predetermined area based on the number set by the print ratio setting unit; and
- a unit that prints an image on the print medium by causing the print heads to eject ink while repeating the forward print scan and the backward print scan based on the print data generated by the print data generation unit.

9. The inkjet printing apparatus according to claim 8, wherein the print data generation unit converts the multi-value image data of a pixel that is allocated to mode A into binary data corresponding to a plurality of areas, each of which prints one dot, by using an index pattern in which print data is arranged such that dots will be printed evenly by both of the forward scan and the backward scan and converts the multi-value image data of a pixel that is allocated to mode B into binary data corresponding to a plurality of areas, each of which prints one dot, by using an index pattern in which print data is arranged such that dots will be printed only by the forward scan or the backward scan.

10. The inkjet printing apparatus according to claim 8, wherein the color information is signal values that are calculated from a plurality of signals of the multi-value image data, each corresponding to the plurality of colors of inks respectively, and corresponds to the amount of each of the plurality of inks printed at the predetermined area.

11. An inkjet printing apparatus according to claim 8 wherein said print ratio setting unit sets, from said multi-value image data of said plurality of pixels, sets said print ratio of said forward scans and said print ratio of said backward scans at said predetermined area based on the hue of the image printed at said predetermined area.

12. The inkjet printing apparatus according to claim 8, wherein the multi-value image data is CMYK data.

* * * * *